United States Patent
Gernand et al.

(10) Patent No.: US 12,449,035 B1
(45) Date of Patent: Oct. 21, 2025

(54) REINFORCEMENT RING FOR GASKET

(71) Applicant: GM GLOBAL TECHNOLOGY OPERATIONS LLC, Detroit, MI (US)

(72) Inventors: Erich Gernand, Flint, MI (US); Sharanabasappa Madhwarkar, Bengaluru (IN); Harish Kelamane, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/768,803

(22) Filed: Jul. 10, 2024

(51) Int. Cl.
*F16J 15/12* (2006.01)

(52) U.S. Cl.
CPC .................. *F16J 15/121* (2013.01)

(58) Field of Classification Search
CPC ......... F16J 15/121; F16J 15/122; F16J 15/135
See application file for complete search history.

(56) References Cited

U.S. PATENT DOCUMENTS

| | | | | |
|---|---|---|---|---|
| 2,330,425 A * | 9/1943 | Hilton | ...................... | F16J 15/121 277/649 |
| 2,747,905 A * | 5/1956 | Clade | ...................... | F16J 15/121 277/362 |
| 2,764,311 A * | 9/1956 | Blackman | .............. | F16J 15/121 277/649 |
| 3,279,805 A | 10/1966 | Quinson | | |
| 3,512,789 A * | 5/1970 | Tanner | .................... | F16J 15/164 277/647 |
| 4,560,174 A * | 12/1985 | Bisi | ...................... | B62D 55/088 277/910 |
| 6,224,065 B1 * | 5/2001 | Smith | .................... | F16J 15/125 277/654 |
| 6,290,240 B1 | 9/2001 | Knapp | | |
| 6,708,984 B1 * | 3/2004 | North | ..................... | F16J 15/104 277/625 |
| 7,621,568 B2 * | 11/2009 | Schroeder | .............. | F16J 15/061 285/205 |
| 7,722,053 B2 * | 5/2010 | Hanashima | ............ | F16J 15/125 285/379 |
| 8,104,773 B2 * | 1/2012 | Schroeder | .............. | F16L 41/086 285/368 |
| 8,523,244 B2 * | 9/2013 | Schroeder | .............. | F16J 15/061 285/205 |
| 9,261,194 B2 * | 2/2016 | Kesler | .................... | F16L 23/032 |
| 10,030,775 B2 * | 7/2018 | Gugenberger | ......... | F16J 15/121 |
| 10,197,162 B2 * | 2/2019 | Yanagi | .................... | F16J 15/104 |
| 10,612,660 B2 * | 4/2020 | Yanagi | .................... | F16J 15/125 |
| 11,060,653 B2 * | 7/2021 | Kesler | .................... | F16L 41/02 |
| 11,085,564 B2 * | 8/2021 | Edwards | ................. | F16L 23/20 |
| 11,460,109 B2 * | 10/2022 | Makinae | ................ | F16J 15/127 |
| 11,555,565 B2 * | 1/2023 | Pease | .................. | F16L 19/0218 |

(Continued)

FOREIGN PATENT DOCUMENTS

DE 8901604 U1 3/1989

OTHER PUBLICATIONS

German Office Action from counterpart DE1020241252030, dated Mar. 5, 2025.

*Primary Examiner* — Nicholas L Foster

(57) ABSTRACT

A seal assembly including: a housing with an outer wall; a gasket surrounded by the outer wall; and a reinforcement ring in contact with the gasket. The gasket is between the reinforcement ring and the housing.

11 Claims, 4 Drawing Sheets

(56) References Cited

U.S. PATENT DOCUMENTS

| | | | | |
|---|---|---|---|---|
| 2007/0001403 A1* | 1/2007 | Hanashima | ............ | F16J 15/125 |
| | | | | 277/590 |
| 2007/0273102 A1* | 11/2007 | Schroeder | .............. | F16J 15/062 |
| | | | | 277/312 |
| 2010/0052268 A1* | 3/2010 | Schroeder | .............. | F16L 41/086 |
| | | | | 277/612 |
| 2011/0210545 A1* | 9/2011 | Kesler | ................... | F16L 41/086 |
| | | | | 285/336 |
| 2012/0091708 A1* | 4/2012 | Schroeder | .............. | F16L 41/086 |
| | | | | 285/374 |
| 2013/0038027 A1* | 2/2013 | Feldner | .................. | F16J 15/121 |
| | | | | 277/591 |
| 2016/0290508 A1* | 10/2016 | Gugenberger | ......... | G01L 9/0075 |
| 2017/0089465 A1* | 3/2017 | Yanagi | ................... | F16J 15/125 |
| 2017/0226958 A1* | 8/2017 | Cline | ...................... | F02F 1/004 |
| 2019/0032783 A1* | 1/2019 | Yanagi | ..................... | F16J 15/12 |
| 2021/0108726 A1* | 4/2021 | Makinae | ................. | F16J 15/127 |
| 2021/0164570 A1* | 6/2021 | Amano | ................. | F16J 15/121 |

* cited by examiner

REINFORCEMENT RING FOR GASKET

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a reinforcement ring for a gasket.

A vehicle typically includes numerous connecting joints. Many of the connecting joints include a gasket, which provides a liquid-tight seal. Such a connecting joint may be found at, for example, an interface between an engine oil cooler and an upper oil pan. Connecting joints including a gasket are found in various non-automotive applications as well.

SUMMARY

The present disclosure includes, in various features, a seal assembly including: a housing with an outer wall; a gasket surrounded by the outer wall; and a reinforcement ring in contact with the gasket. The gasket is between the reinforcement ring and the housing.

In further features, the gasket is in contact with the outer wall.

In further features, the housing includes a ledge, the gasket is seated on the ledge.

In further features, the gasket is made of an elastomeric material.

In further features, the gasket is circular and the reinforcement ring is surrounded by the gasket.

In further features, the reinforcement ring includes a first end and a second end spaced apart from the first end.

In further features, the reinforcement ring includes a first end and a second end overlapping the first end.

In further features, the reinforcement ring includes a first end with a first rounded edge and a second end with a second rounded edge.

In further features, the reinforcement ring is made of steel.

In further features, the reinforcement ring is flexible, seated within the gasket, and preloaded radially outward against the gasket.

In further features, the gasket is configured to contract when heated.

In further features, the reinforcement ring is shorter than the outer wall.

The present disclosure also provides for, in various features, a seal assembly including: a housing with an outer wall and a ledge extending inward from the outer wall; a gasket seated on the ledge, in contact with the outer wall, and surrounded by the outer wall; and a reinforcement ring in contact with the gasket. The gasket is between the reinforcement ring and the housing.

In further features, the reinforcement ring includes a first end and a second end spaced apart from the first end.

In further features, the reinforcement ring includes a first end and a second end overlapping the first end.

In further features, the reinforcement ring is made of steel.

The present disclosure further provides for, in various features, a seal assembly including: a housing including an outer wall and a ledge extending inward from the outer wall; a gasket seated on the ledge, in contact with the outer wall, and surrounded by the outer wall; and a reinforcement ring in contact with the gasket, the reinforcement ring including a first end with a first rounded edge and a second end with a second rounded edge, the gasket between the reinforcement ring and the housing. The reinforcement ring is flexible, shorter than the outer wall, seated within the gasket, and preloaded radially outward against the gasket.

In further features, the reinforcement ring includes a first end and a second end spaced apart from the first end.

In further features, the reinforcement ring includes a first end and a second end overlapping the first end.

In further features, the reinforcement ring further includes a rounded upper surface extending around the reinforcement ring, a rounded lower surface extending around the reinforcement ring, and rounded corners adjacent to the first end and the second end.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
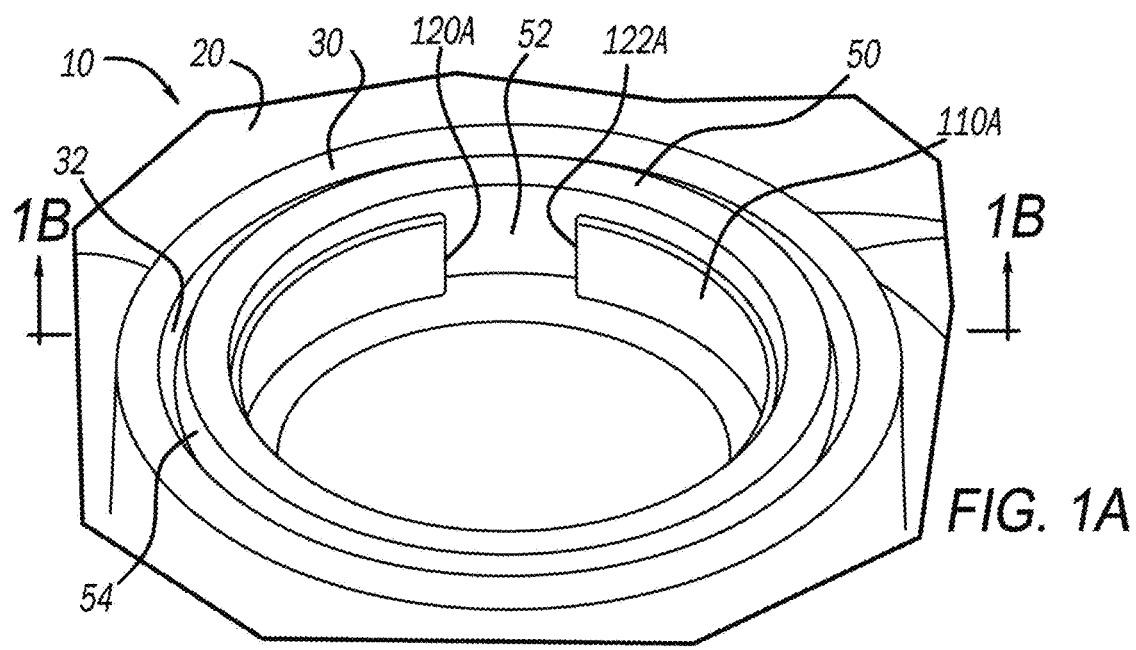
FIG. 1A is a perspective view of a seal assembly in accordance with the present disclosure.
Figure 1B:
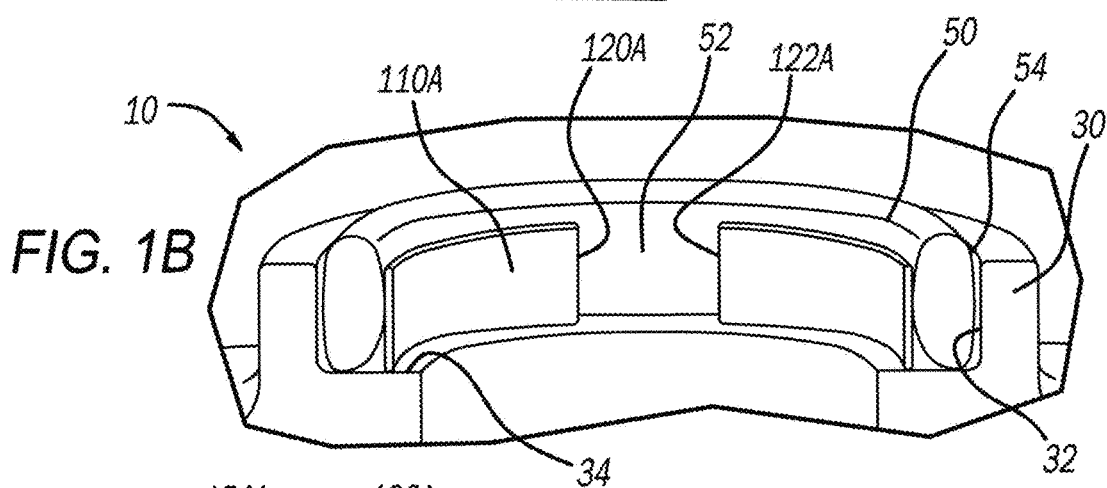
FIG. 1B is a cross-sectional view of FIG. 1A.
Figure 1C:
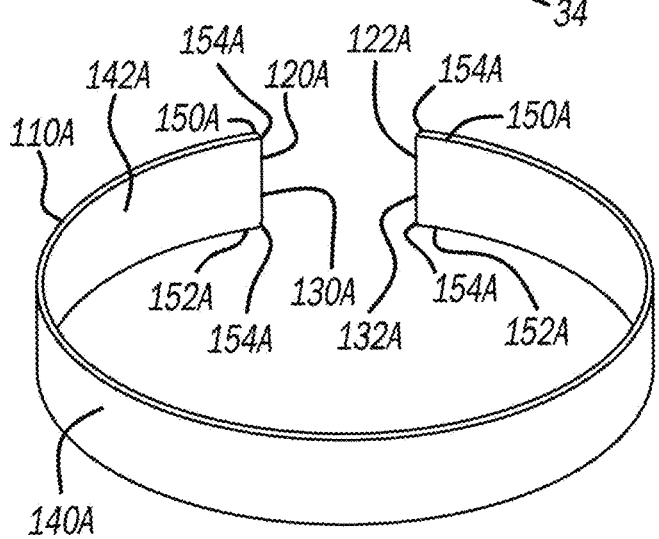
FIG. 1C is a perspective view of a reinforcement ring for a gasket included with the seal assembly of FIG. 1A.
Figure 1D:
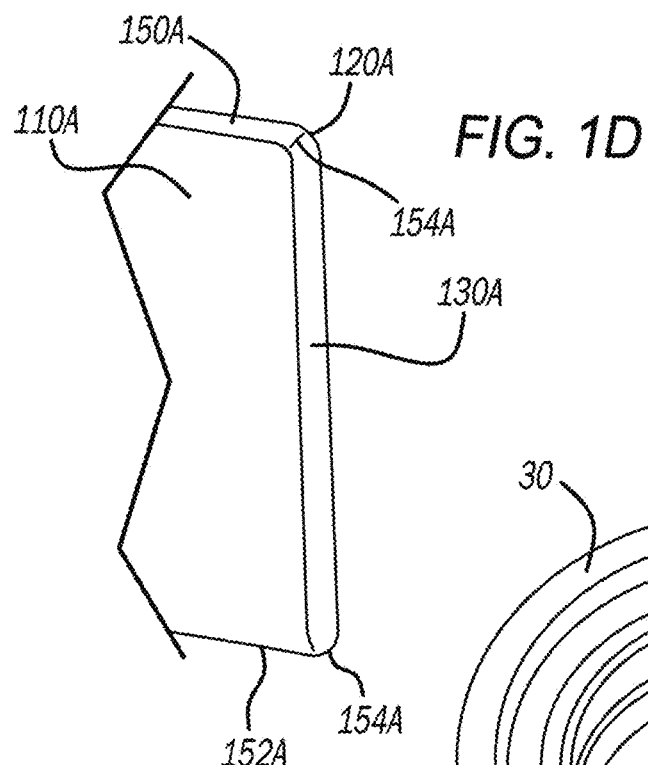
FIG. 1D illustrates a rounded end with rounded corners, a rounded top surface, and a rounded bottom surface of the reinforcement ring of FIG. 1C.

The present disclosure includes a seal assembly for a connecting joint, such as an automotive or non-automotive connecting joint. The seal assembly includes a gasket, which provides a liquid-tight seal. Such connecting joints and seal assemblies can be used at various locations. With respect to automotive connecting joints, they may be used, for example, to connect an engine oil cooler to an upper oil pan, to connect an engine oil pump to an upper oil pan, at an oil cooler joint, etc. The seal assembly of the present disclosure includes a housing with an outer wall, but no inner wall. Elimination of an inner wall saves space, simplifies manufacturing, and enhances sealing, for example. The gasket is seated against the outer wall. A reinforcement ring is seated against the gasket to prevent the gasket from rolling inward, away from the outer wall.

FIGS. 1A-1D illustrate an exemplary seal assembly 10 in accordance with the present disclosure. The seal assembly 10 is illustrated as included with an exemplary component or part 20. The part 20 may be any suitable automotive or non-automotive part. For example, the part 20 may be an engine oil cooler, an upper oil pan, an engine pump, etc.

The seal assembly 10 includes a housing 30, which may include, or be configured as, a flange. The housing 30 includes an outer wall 32. The housing 30 does not include an inner wall. The outer wall 32 is circular in the example illustrated, but may have any suitable shape. Extending inward from the outer wall 32 is a ledge 34 (see FIG. 1B).

Seated on the ledge 34 is a gasket 50. The gasket 50 is surrounded by the outer wall 32. The gasket 50 may be circular as illustrated, or have any other suitable shape. The shape of the gasket 50 will typically correspond to the shape of the outer wall 32. The gasket 50 includes an inner gasket surface 52 and an outer gasket surface 54, which is generally opposite to the inner gasket surface 52. The outer gasket surface 54 contacts the outer wall 32 of the housing 30. The gasket 50 is configured to provide a liquid-tight seal, and may be made of any suitable material to provide such a seal. For example, the gasket 50 may be made of any suitable elastomeric material. The gasket 50 seals against another part (not shown) seated against the gasket 50 and the housing 30.

The seal assembly 10 further includes a reinforcement ring 110A. The reinforcement ring 110A is in contact with the inner gasket surface 52 of the gasket 50. The reinforcement ring 110A may be seated on the ledge 34, such that the gasket 50 is between the reinforcement ring 110A and the housing 30. The reinforcement ring 110A includes a first end 120A and a second end 122A. The reinforcement ring 110A further includes an outer ring surface 140A and an inner ring surface 142A, which is opposite to the outer ring surface 140A. The outer ring surface 140A abuts the inner gasket surface 52 of the gasket 50. The reinforcement ring 110A has a height that is shorter than the outer wall 32 to facilitate cooperation between the housing 30/gasket 50 and an opposite side of the seal assembly 10 (not shown).

The reinforcement ring 110A may be made of any suitable material, such as steel. The reinforcement ring 110A is generally a steel sheet, which is curled and seated within the gasket 50 so that the first end 120A is opposite to, and faces, the second end 122A. The reinforcement ring 110A is flexible and biased to expand outward against the inner gasket surface 52, which prevents the gasket 50 from potentially rolling inward away from the outer wall 32. The reinforcement ring 110A is generally "preloaded" to expand radially outward against the inner gasket surface 52 so that the reinforcement ring 110A and the gasket 50 do not detach from each other. The reinforcement ring 110A maintains the gasket 50 in place in the absence of an inner wall of the housing 30, and enhances sealing performance of the gasket 50. The elimination of an inner wall saves space, reduces weight, and provides various other advantages.

The reinforcement ring 110A is configured to contract and expand in response to changes in temperature. During the contraction and expansion, the first end 120A and the second end 122A slide along the inner gasket surface 52 of the gasket 50. To facilitate this sliding movement, the first end 120A includes a first rounded edge 130A and the second end 122A includes a second rounded edge 132A (see FIGS. 1C and 1D, for example). The first rounded edge 130A and the second rounded edge 132A are configured to slide along the inner gasket surface 52 without "pinching" the inner gasket surface 52. To further facilitate sliding, the reinforcement ring 110A includes a rounded upper surface 150A extending around the reinforcement ring 110A, a rounded lower surface 152A extending around the reinforcement ring 110A, and rounded corners 154A adjacent to the first rounded edge 130A and the second rounded edge 132A.

Figure 2A:
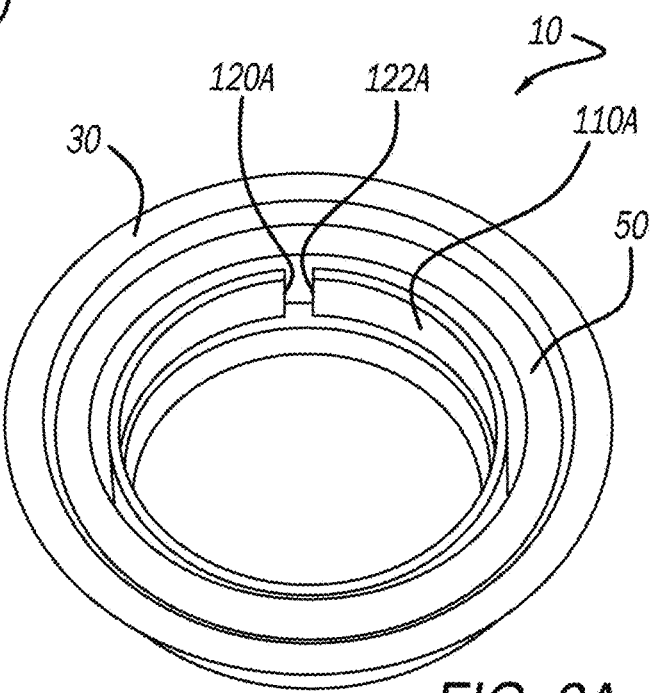
FIG. 2A illustrates the reinforcement ring in a contracted state in response to being heated.
Figure 2B:
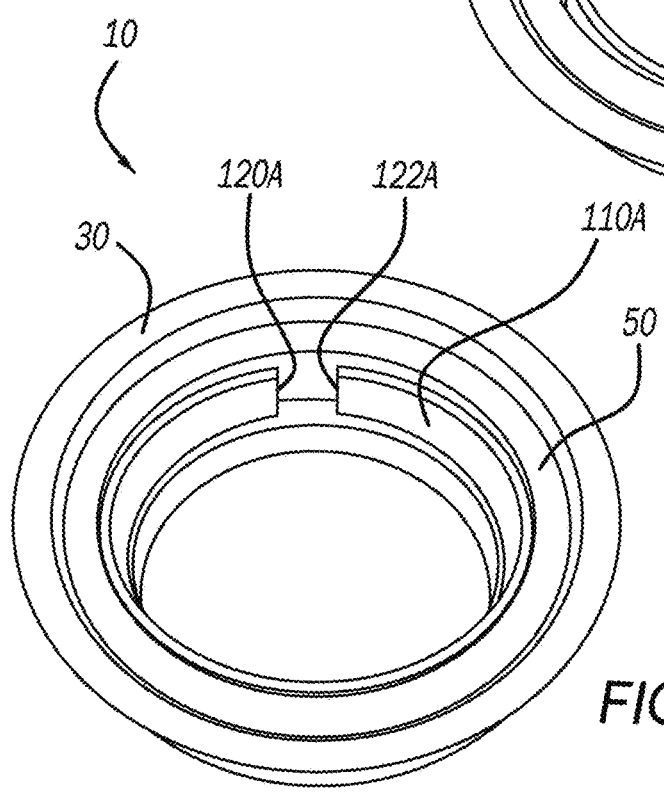
FIG. 2B illustrates the reinforcement ring in an expanded state relative to the contracted state after cooling.

With reference to FIGS. 2A and 2B, the reinforcement ring 110A is seated within the gasket with the first end 120A and the second end 122A opposite to, and spaced apart from, each other. When subject to increased temperature, the gasket 50 contracts, which contracts the reinforcement ring 110A so that the reinforcement ring 110A maintains contact with the gasket 50. As the reinforcement ring 110A contracts, the first end 120A and the second end 122A move closer together from an initial position (FIGS. 1A and 1B) to a contracted position (FIG. 2A). As the gasket 50 cools and expands, the reinforcement ring 110A is configured to expand with the gasket 50 to maintain contact with the gasket 50, as illustrated in FIG. 2B. In the expanded position of FIG. 2B, the first end 120A and the second end 122A may be closer together than in the initial position of FIGS. 1A and 1B (as illustrated in FIG. 2B) or further apart. The reinforcement ring 110A is configured to subsequently contract and expand with the gasket 50 to maintain contact with the gasket 50, and prevent the gasket 50 from rolling inward away from the outer wall 32 during temperature fluctuations. The reinforcement ring 120A has an inner diameter that is the same as, or generally the same as, an inner diameter of the gasket 50. The reinforcement ring 110A remains in contact with the gasket 50 to prevent rotation of the reinforcement ring 110A relative to the gasket 50.

FIGS. 3A, 3B, 30, 4A, and 4B illustrate the seal assembly 10 including an alternate reinforcement ring 110B in accordance with the present disclosure. The reinforcement ring 110B is substantially similar to the reinforcement ring 110A. Features of the reinforcement ring 110B that are the same as, or substantially similar to, the reinforcement ring 110A are identified in the figures with the same reference numbers, but including the suffix "B" instead of "A." The description of these same or similar features set forth above in the description of the reinforcement ring 110A is also sufficient to describe the reinforcement ring 110B.

Figure 4A:
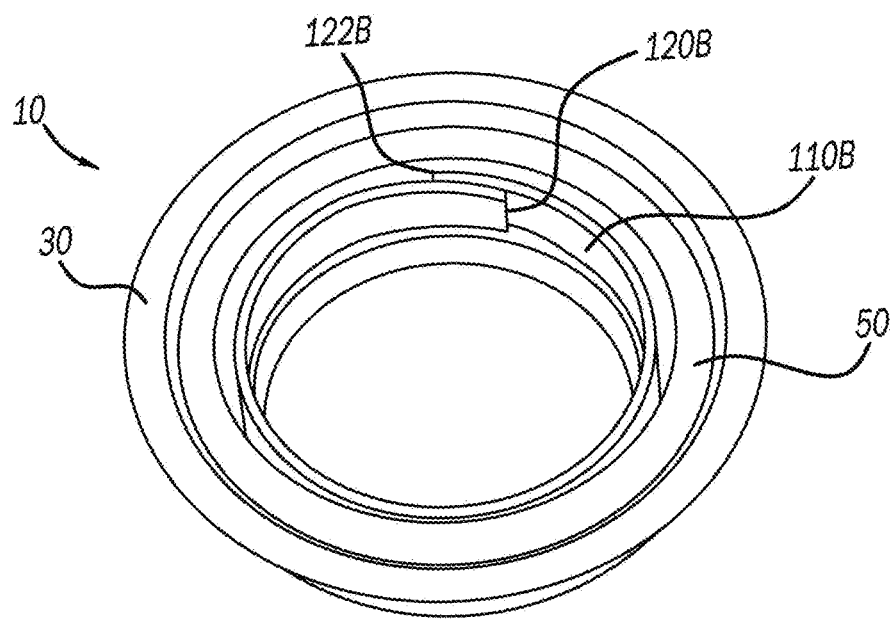
FIG. 4A is a perspective view of the reinforcement ring of FIG. 3A in a contracted state in response to being heated.
Figure 4B:
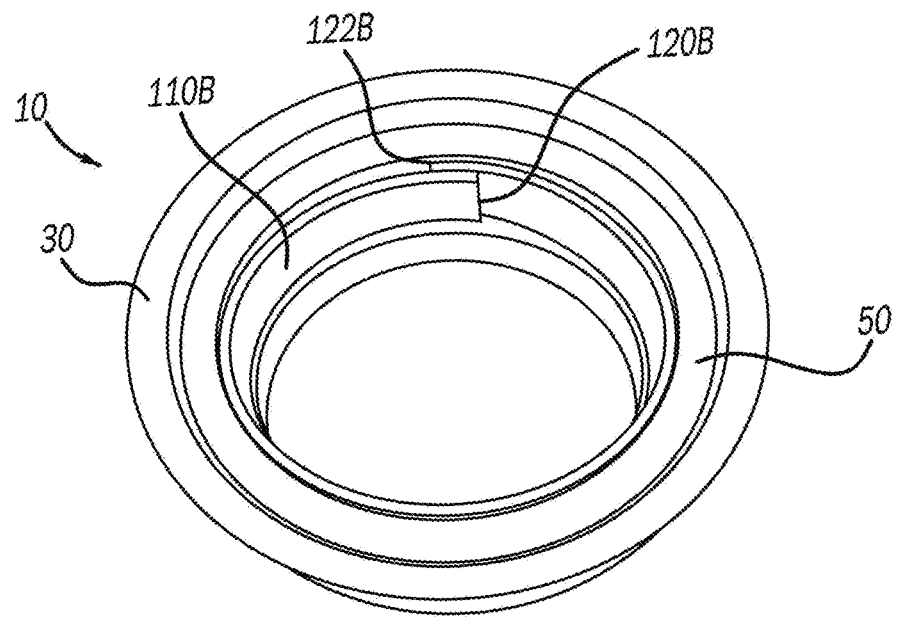
FIG. 4B illustrates the reinforcement ring of FIG. 3A in an expanded state relative to the contracted state after cooling.

The reinforcement ring 110B is longer than the reinforcement ring 110A. Thus, the first end 120B and the second end 122B overlap. With particular reference to FIG. 4A, when the gasket 50 is subject to increased heat, the gasket 50 contracts, which contracts the reinforcement ring 110B. As the reinforcement ring 110B contracts, the overlap between the first end 120B and the second end 122B increases. As the gasket 50 cools and expands, the reinforcement ring 110B is biased to expand radially outward and remain in contact with the gasket 50. As the reinforcement ring 110B expands radially outward, the overlap between the first end 120B and the second end 122B decreases.

Figure 3A:
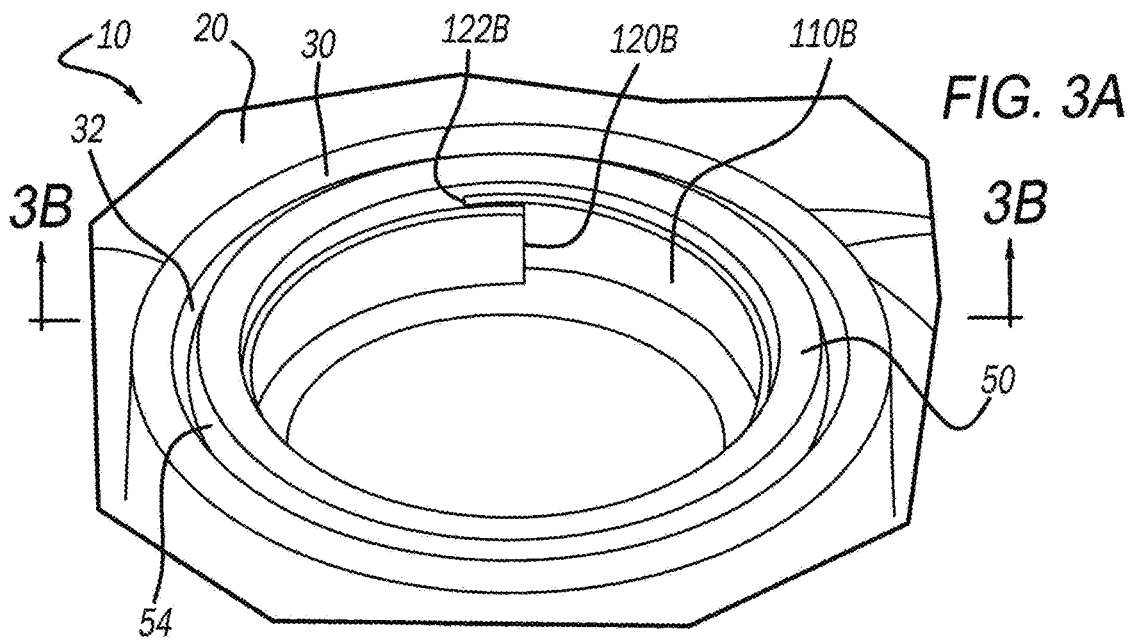
FIG. 3A is a perspective view of the seal assembly including an alternate reinforcement ring in accordance with the present disclosure.
Figure 3B:
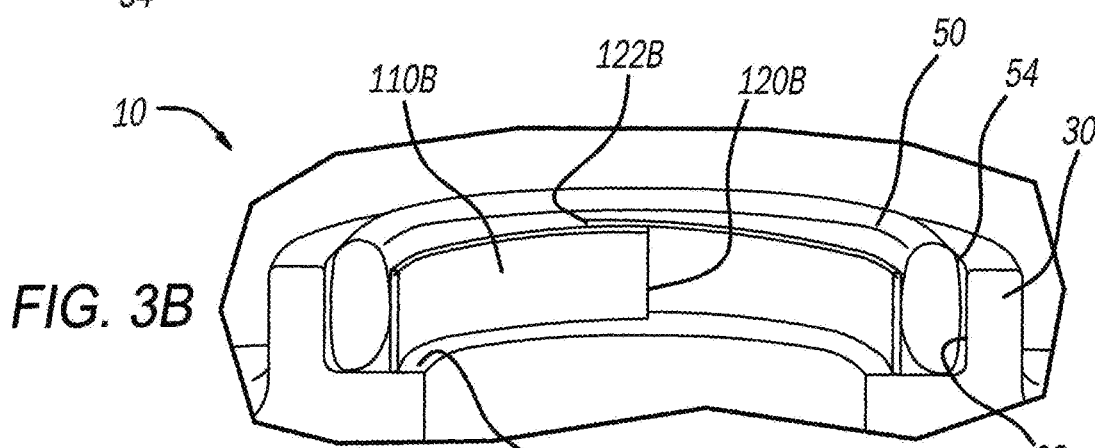
FIG. 3B is a cross-sectional view of FIG. 3A.
Figure 3C:
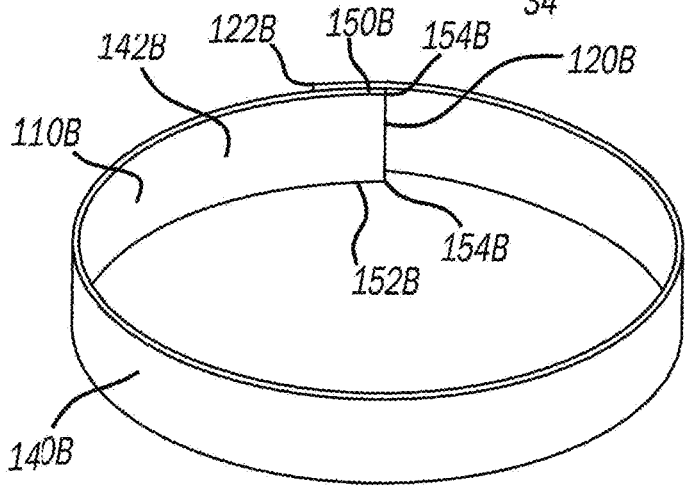
FIG. 3C is a perspective view of the reinforcement ring of FIG. 3A.

As the reinforcement ring 110B expands and contracts, the first end 120B slides along an inner surface of the reinforcement ring 110B, and the second end 122B slides along an outer surface of the reinforcement ring 110B. At the first end 120B is a first rounded edge that is the same as, or similar to, the rounded edge 130A, and at the second end 122B is a second rounded edge that is the same as, or similar to, the rounded edge 132A. With particular reference to FIG. 3C, to further facilitate sliding, the reinforcement ring 110B includes a rounded upper surface 150B extending around the reinforcement ring 110B, a rounded lower surface 152B extending around the reinforcement ring 110B, and rounded corners 154B adjacent to the first end 120B and the second end 122B.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A seal assembly comprising:
   a housing including an outer wall;
   a gasket surrounded by the outer wall, the gasket made of an elastomeric material configured to contract when heated; and
   a reinforcement ring in contact with the gasket, the gasket between the reinforcement ring and the housing,
   wherein:
      the reinforcement ring is a substantially cylindrical split ring including a first end and a second end spaced apart from the first end to define a gap therebetween, the reinforcement ring is made of a flexible material configured to bias the reinforcement ring radially outward against the gasket, and
      when heated, the gasket is configured to contract and thereby contract the reinforcement ring.

2. The seal assembly of claim 1, wherein the gasket is in contact with the outer wall.

3. The seal assembly of claim 1, wherein the housing further includes a ledge, the gasket is seated on the ledge.

4. The seal assembly of claim 1, wherein the gasket is circular and the reinforcement ring is surrounded by the gasket.

5. The seal assembly of claim 1, wherein the first end includes a first rounded edge and the second end includes a second rounded edge.

6. The seal assembly of claim 1, wherein the reinforcement ring is made of steel.

7. The seal assembly of claim 1, wherein the reinforcement ring is shorter than the outer wall.

8. A seal assembly comprising:
   a housing including an outer wall and a ledge extending inward from the outer wall;
   a gasket seated on the ledge, in contact with the outer wall, and surrounded by the outer wall, the gasket made of an elastomeric material configured to contract when heated; and
   a reinforcement ring in contact with the gasket, the gasket between the reinforcement ring and the housing,
   wherein:
      the reinforcement ring is a substantially cylindrical split ring including a first end and a second end spaced apart from the first end to define a gap therebetween, the reinforcement ring is made of a flexible material configured to bias the reinforcement ring radially outward against the gasket, and
      when heated, the gasket is configured to contract and thereby contract the reinforcement ring.

9. The seal assembly of claim 8, wherein the reinforcement ring is made of steel.

10. A seal assembly comprising:
    a housing including an outer wall and a ledge extending inward from the outer wall;
    a gasket seated on the ledge, in contact with the outer wall, and surrounded by the outer wall, the gasket made of an elastomeric material configured to contract when heated; and
    a reinforcement ring in contact with the gasket, the reinforcement ring is a substantially cylindrical split ring including a first end with a first rounded edge and a second end with a second rounded edge, the first end is spaced apart from the second end to define a gap therebetween, the reinforcement ring is made of a flexible material configured to bias the reinforcement ring radially outward against the gasket, the gasket between the reinforcement ring and the housing,
    wherein:
       the reinforcement ring is flexible, shorter than the outer wall, seated within the gasket, and preloaded radially outward against the gasket, and
       when heated, the gasket is configured to contract and thereby contract the reinforcement ring.

11. The seal assembly of claim 10, wherein the reinforcement ring further includes a rounded upper surface extending around the reinforcement ring, a rounded lower surface extending around the reinforcement ring, and rounded corners adjacent to the first end and the second end.

* * * * *